United States Patent [19]

Huber

[11] Patent Number: 5,170,066
[45] Date of Patent: Dec. 8, 1992

[54] SINGLE-SENSING AIRBAG SYSTEM WITH ZERO POWER CONSUMPTION IN THE "KEY-OFF" STAGE

[75] Inventor: Anton S. Huber, Auburn Hills, Mich.

[73] Assignee: Siemens Automotive L.P., Auburn Hills, Mich.

[21] Appl. No.: 657,704

[22] Filed: Feb. 19, 1991

[51] Int. Cl.⁵ .............................................. B60R 21/32
[52] U.S. Cl. .................................... 307/10.1; 180/274; 280/735; 340/436
[58] Field of Search ................ 180/274, 282; 280/734, 280/735; 307/10.1; 340/436

[56] References Cited

U.S. PATENT DOCUMENTS

| | | | |
|---|---|---|---|
| 4,222,030 | 9/1980 | Yasui et al. | 180/274 |
| 4,275,901 | 6/1981 | Okada | 280/741 |
| 4,287,431 | 9/1981 | Yasui et al. | 307/10.1 |
| 4,381,829 | 5/1983 | Montaron | 180/274 |
| 4,384,734 | 5/1983 | Yasui | 280/735 |
| 4,438,424 | 3/1984 | Yasui | 280/735 |
| 4,695,075 | 9/1987 | Kamiji et al. | 280/735 |
| 4,701,628 | 10/1987 | Kumasaka et al. | 340/438 |
| 4,740,741 | 4/1988 | Andres et al. | 323/303 |
| 4,804,859 | 2/1989 | Swart | 307/10.1 |
| 4,933,570 | 6/1990 | Swart et al. | 307/10.1 |
| 5,023,468 | 6/1991 | Drobny et al. | 307/10.1 |
| 5,045,835 | 9/1991 | Masegi et al. | 280/734 |
| 5,068,640 | 11/1991 | Burger et al. | 180/282 |

FOREIGN PATENT DOCUMENTS 3913628  11/1989  Fed. Rep. of Germany ...... 280/734

Primary Examiner—Jeffrey A. Gaffin
Attorney, Agent, or Firm—George L. Boller; Russel C. Wells

[57] ABSTRACT

When the key-operated ignition switch is turned on, the electronic activation device, which contains a solid state deceleration sensor and crash data processing and diagnostic electronics, is energized so that it is on alert to give a deployment signal to the firing squib when a crash for which the airbag should be deployed is detected by the electronic activation device. When the ignition switch is turned off, the electronic activation device is disconnected from the battery so that it does not drain the battery, but the squib can still be fired by an associated electromechanical crash sensor. There are two circuits which employ these general principles in particular ways.

2 Claims, 1 Drawing Sheet

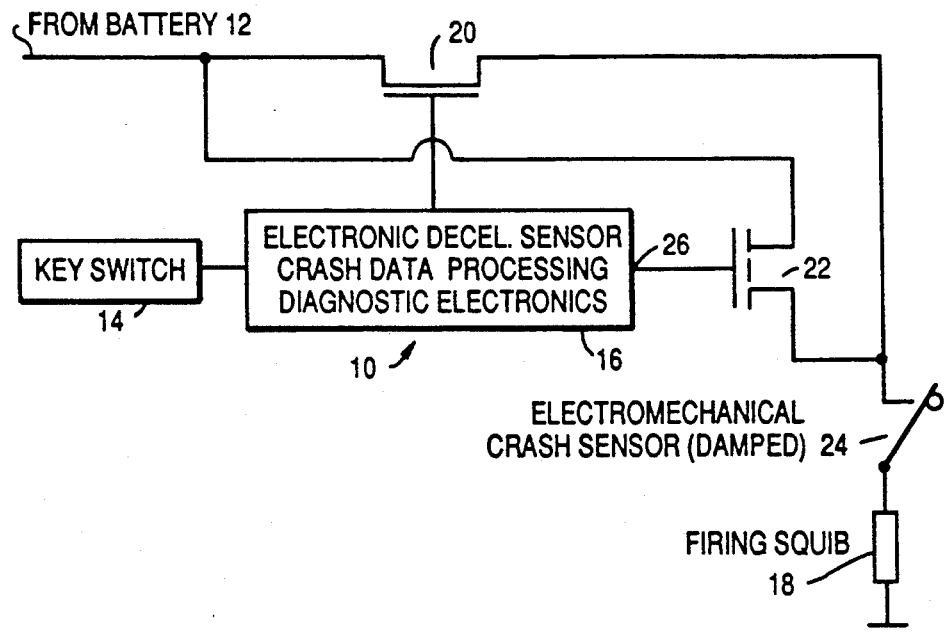
FIG.1
FIG.2
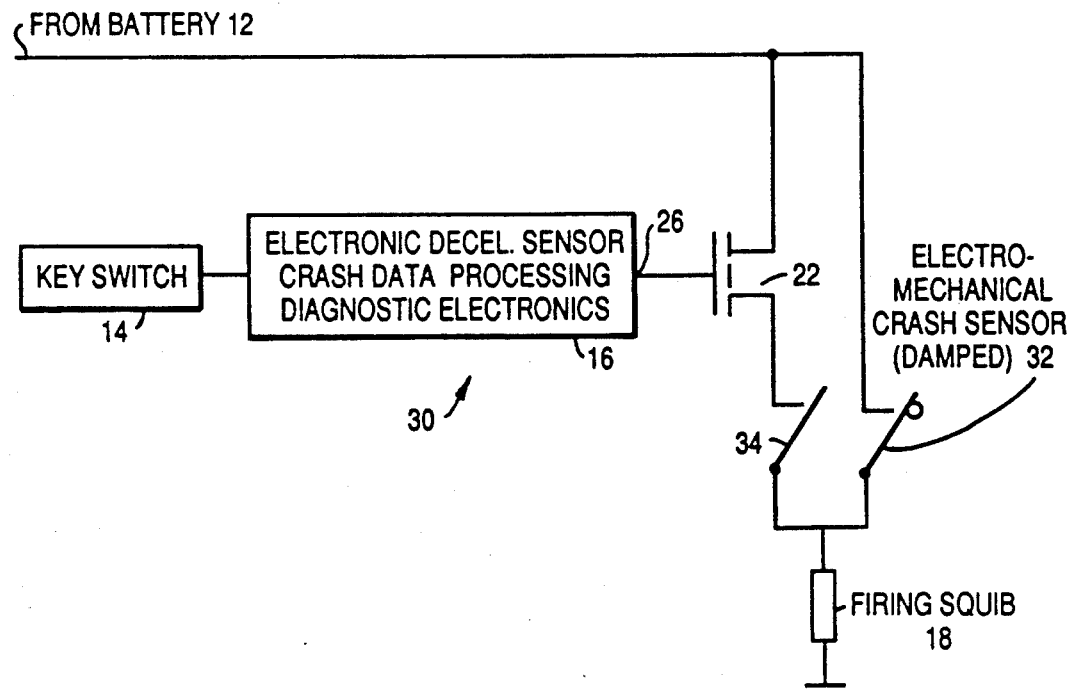

SINGLE-SENSING AIRBAG SYSTEM WITH ZERO POWER CONSUMPTION IN THE "KEY-OFF" STAGE

FIELD OF THE INVENTION

This invention relates generally to deployable occupant restraint systems of automotive vehicles, and specifically to an electric circuit for deploying a supplemental inflatable restraint, such as an airbag.

BACKGROUND AND SUMMARY OF THE INVENTION

Single-sensing systems, which utilize electronic activation devices (solid state sensor, microprocessor) to deploy an airbag in the case of a crash, are normally inactive in the "key-off" stage of the vehicle. A "key-off" stage primarily occurs when a vehicle is parked. This means an electronically activated inflatable restraint system could not protect a passenger in a parked car when another vehicle collides into it. The relatively high power consumption of the electronic activation device makes it impractical to keep the system active in the "key-off" stage by continuous connection to the vehicle's battery since a dead battery would be the eventual result of a long-lasting "key-off".

Efforts to develop a single-sensing airbag system that utilizes an electromechanical sensor which would not consume power in the "key-off" stage have not been successful to date due to the inability of such a sensor to possess the crash detection capabilities of an electronic activation device.

If the electromechanical sensor is trimmed in such a way that it can detect all of the crashes which it is supposed to detect according to relevant specifications, then in practice, the sensor is already "over-sensitive". This means that, under certain circumstances, the sensor will trigger the deployment of the airbag when it should not do so.

If the electromechanical sensor is trimmed in such a way that inadvertent deployments are excluded, then the sensor is already so far insensitive that it cannot detect certain real crash situations. Such a sensor is called "under-sensitive".

In a parked vehicle, both types of electromechanical sensors are able to detect all crash situations which are specified because some difficult circumstances, such as pole crashes and rough road conditions, can be excluded.

To solve the problem of providing airbag protection in a single sensing system in the "key-off" stage, a combination of two principles is proposed: 1) the electronic activation device will be active during the "key-on" stage of the vehicle because it possesses the ability to detect borderline crash impulses under very difficult conditions, such as rough road conditions, pole crashes, etc; and 2) an electromechanical sensor will be used in the "key-off" stage since it does not consume any power while on alert and since conditions for detecting a crash are less difficult when the vehicle is stopped, as would typically be the case when in the "key-off" stage. The invention which provides the solution embodying these two principles will be subsequently described in detail.

A preliminary search of the state of the art has revealed a number of US patents, but none is pertinent to the invention, except to the extent that some disclose airbag systems in which several electromechanical crash sensors are connected in a circuit that is continuously connected to the battery so as to be on alert in both the "key-on" and the "key-off" stages and to the extent that some disclose airbag systems in which an electronic activation device is on alert only in the "key-on" stage. For the record, the search developed U.S. Pat. Nos.: 4933570, 4804859, 4740741, 4701628, 4695075, 4384734, 4381829, 4287431, 4275901, and 4222030.

The principles of the invention will be disclosed with reference to two drawing Figures which show two embodiments in schematic form.

BRIEF DESCRIPTION OF THE DRAWINGS

FIG. 1 is a schematic diagram representing a first proposed solution to the problem described earlier.

FIG. 2 is a schematic diagram representing a second proposed solution.

DESCRIPTION OF A PREFERRED EMBODIMENT

FIG. 1 shows a supplemental inflatable restraint system 10 of an automotive vehicle. The vehicle has a D.C. electrical system that is powered by a battery 12, which, in the case of the vehicle's motor being an internal combustion engine, is typically kept charged by a battery charging system (not shown) that is operated by the engine. The vehicle also has an on-off switch 14 for turning the vehicle's motor on and off, and that switch is typically key-operated. When the vehicle's motor is an internal combustion engine, the key-operated on-off switch is customarily referred to as an ignition switch.

System 10 comprises an electronic activation device 16 which contains an electronic deceleration sensor and crash data processing and diagnostic electronics. System 10 further comprises a firing squib 18 that is adapted to be ignited by electric current to quickly activate a gas generator that deploys the associated restraint device, typically an airbag. In accordance with the invention, electronic activation device 16 and firing squib 18 are connected with battery 12 and switch 14 in an electric circuit which further includes two switches 20, 22 and an electromechanical crash sensor 24.

Crash sensor 24 comprises an "over-sensitive", normally open, damped deceleration switch that is sufficiently sensitive to close at the incipiency of any crash for which squib 18 should be fired to deploy the associated restraint, but does not close in non-crash decelerations, such as intentional braking of the vehicle by the vehicle's brake system. Crash sensor 24 is connected in series with squib 18 and the two are connected via two independent coupling circuits across battery 12. The first of these coupling circuits comprises switch 20, and the second comprises switch 22. Both switches 20 and 22 are associated with activation device 16.

When switch 14 is off, the engine's ignition is off and the engine is not running. Switch 14 also controls the electrical energization of activation device 16. When switch 14 is open, battery power is disconnected from activation device 16, and hence the activation device is not energized. When switch 14 is closed, current can flow from battery 12 to energize activation device 16.

Switch 20 is open whenever activation device 16 is energized and is closed whenever activation device 16 is not energized. Thus, when activation device 16 is not energized due to the ignition being off, crash sensor 24 is capable by itself of firing squib 18 to cause deployment of the associated occupant restraint. Current for firing the squib will flow from battery 12, through switch 20, and through switch 24 to the squib.

But when activation device 16 is energized due to the ignition being on, crash sensor 24 is incapable by itself of firing squib 18 because the circuit back to battery 12 through switch 20 has been opened by the opening of switch 20. However, because it is now energized, activation device 16 will be capable of producing a deployment command signal at its output 26 when it detects the incipiency of a crash, including what is called a borderline crash, for which the associated occupant restraint should be deployed. The occurrence of such a signal will immediately turn switch 22 from off to on. Since the deceleration-responsive switch of crash sensor 24 also operates from open to closed upon the incipiency of a crash for which the associated occupant restraint should be deployed, both switch 22 and the switch of crash sensor 24 will be closed essentially simultaneously to complete a circuit from squib 18 back to battery 12. As a result, the squib is fired, and the associated occupant restraint is deployed. The combination of device 16 and switch 22 suppresses airbag deployment in cases where the over-sensitive electromechanical sensor would otherwise cause inadvertent airbag deployment. In addition, the electromechanical sensor 24 prevents an airbag deployment in the "key-off" stage when an electromagnetic interference prompts switch 22 to close but no relevant deceleration exists.

In summary then, it has been demonstrated that the system of FIG. 1 will be capable of deploying the occupant restraint both when the key-operated ignition switch 14 is on and when it is off, and that when switch 14 is off, no power is consumed by activation device 16. Therefore, the invention retains the benefits of an electronic activation device for crashes occurring while the ignition switch is on, while possessing the capability for deploying the occupant restraint when the ignition switch is off without the battery being drained by the electronic activation device.

FIG. 2 shows another system 30 which contains a battery 12, an on-off switch 14, an electronic activation device 16, a firing squib 18, and a switch 22. It also contains an electromechanical crash sensor 32, but this crash sensor is less sensitive to crashes than is the undersensitive crash sensor 24 of FIG. 1. Specifically, crash sensor 32 comprises a deceleration-responsive switch which will always close at the incipiency of crashes which the vehicle may experience while parked with its engine off and for which the airbag should be deployed.

The circuit of FIG. 2 also comprises an electromechanical velocity change switch 34 which is normally open, but closes when the velocity change which it detects is greater than the maximum that the vehicle would experience during non-crash decelerations, i.e. during intentional braking of the vehicle. The purpose of switch 34 is mainly to prevent a deployment of the airbag when an electromagnetic interference impulse causes electronic activation device 16 to produce a spurious deployment signal.

Squib 18 is coupled with battery 12 via two separate coupling circuits. One coupling circuit comprises only crash sensor 32; the other comprises the series-connected switches 22 and 34. Activation device 16 is operatively coupled with switch 22 in the same manner as in the case of FIG. and energization of activation device 16 is selectively controlled by switch 14 also in the same manner as in FIG. 1.

When ignition switch 14 is off, switch 22 remains open because activation device 16 is not energized and therefore cannot give a deployment signal. However, for crashes of the type which can be expected when the vehicle is parked, sensor 32 will close and cause the occupant restraint to deploy.

When ignition switch 14 is on, a deployment signal from activation device 16 will cause squib 18 to fire, provided that the vehicle is experiencing a velocity change greater than the maximum that can occur when the vehicle is braking due to the application of its regular wheel brakes. If a crash impulse lies below the threshold of sensor 32, then devices 22 and 34 carry the current to ignite squib 18. If a crash impulse lies above the threshold of sensor 32, then both coupling circuits to the battery are closed, and the current flows through the path with the lower impedance.

In summary then, it has been demonstrated that the system of FIG. 2 will also be capable of deploying the occupant restraint both when the key-operated ignition switch 14 is on and when it is off, and that when switch 14 is off, no power is consumed by activation device 16. Therefore both of the disclosed circuits provide advantageous solutions to the problem.

What is claimed is:

1. In an automotive vehicle that is powered by a motor, that has a deployable restraint for an occupant of the vehicle, and that has an electrical system which is powered by a battery and includes a first electrical circuit having an on-off switch for turning the motor on and off and a second electrical circuit, including a firing squib, for deploying the restraint at the incipiency of a crash for which the restraint should be deployed by igniting the firing squib by conducting electric current from the battery to the firing squib, the improvement in which said second electrical circuit comprises an electromechanical crash sensor switch that is sufficiently sensitive to operate from an open condition to a closed condition at the incipiency of any crash for which said restraint should be deployed, an electronic activation device that is energized from said battery when the on-off switch is on but not when the on-off switch is off and that when so energized is sufficiently sensitive to give a deployment signal for commanding deployment of the restraint at the incipiency of any crash for which the restraint should be deployed but when not so energized is incapable of giving said deployment signal, a first coupling circuit comprising a first coupling switch through which the firing squib and said electromechanical crash sensor switch are coupled with the battery and which is closed when said electronic activation device is not energized but is open when said electronic activation device is energized, and a second coupling circuit comprising a second coupling switch through which the firing squib and said electromechanical crash sensor switch are coupled with said battery and which is open when said electronic activation device does not give said deployment signal but is closed when said electronic activation device gives said deployment signal.

2. In an automotive vehicle that is powered by a motor, that has a deployable restraint for an occupant of the vehicle, and that has an electrical system which is powered by a battery and includes a first electrical circuit having an on-off switch for turning the motor on and off and a second electrical circuit, including a firing squib, for deploying the restraint at the incipiency of a crash for which the restraint should be deployed by igniting the firing squib by conducting electric current from the battery to the firing squib, the improvement in which said second electrical circuit comprises an electromechanical crash sensor switch that is less sensitive than an electronic activation device that is a part of said second electrical circuit and that operates from an open condition to a closed condition at the incipiency of any crash to which it is sensitive, said electronic activation device is energized from the battery when the on-off switch is on but not when the on-off switch is off, and when so energized, is sufficiently sensitive to give a deployment signal for commanding deployment of the restraint at the incipiency of any crash for which the restraint should be deployed, but when not so energized is incapable of giving said deployment signal, a first coupling circuit through which the firing squib and said electromechanical crash sensor switch are continuously coupled with the battery, and a second coupling circuit comprising two series-connected coupling switches through which said firing squib is coupled with said battery, one of said two series-connected coupling switches being open when said electronic activation device does not give said deployment signal but being closed when said electronic activation device gives said deployment signal, and the other of said two series-connected coupling switches being an electromechanical velocity change switch which operates from open to closed at the incipiency of a deceleration indicative of a velocity change which is greater than deceleration experienced by the vehicle during non-crash deceleration but which is less than deceleration which causes said electromechanical crash sensor switch to operate from open condition to closed condition.

* * * * *